United States Patent [19]

Fenton

[11] Patent Number: 4,731,026

[45] Date of Patent: Mar. 15, 1988

[54] METHOD AND APPARATUS FOR TEACHING SCHOOL BUS SAFETY

[76] Inventor: Hector R. Fenton, 385 Elan Ct., Woodbury, Minn. 55125

[21] Appl. No.: 30,213

[22] Filed: Mar. 25, 1987

[51] Int. Cl.⁴ ............................................. G09B 19/14
[52] U.S. Cl. ..................................................... 434/305
[58] Field of Search ......................................... 434/305

[56] References Cited

U.S. PATENT DOCUMENTS 2,254,810  9/1941  Will ..................................... 434/305
2,968,876  1/1961  McIntosh ............................ 434/305

Primary Examiner—Gregory E. McNeill
Attorney, Agent, or Firm—Merchant, Gould, Smith, Edell, Welter & Schmidt

[57] ABSTRACT

Disclosed is a method and apparatus for teaching school bus safety, which includes a school bus educational kit (10) comprising a rectangular surface (11) having designated areas (12, 13A, 13B, 14, 19) of varying degrees of danger; a movable, three-dimensional school bus (15) which fits in a designated area of the surface; a movable three-dimensional child figure (16); and a movable, three-dimensional car (17).

10 Claims, 2 Drawing Figures

METHOD AND APPARATUS FOR TEACHING SCHOOL BUS SAFETY

FIELD OF THE INVENTION

This invention relates generally to an educational apparatus, and more specifically to a method and apparatus for educating children on the basics of school bus safety.

BACKGROUND OF THE INVENTION

School bus transportation accidents killed about 100 persons in 1984, including 45 pupils, 5 bus drivers and 50 other persons. Injuries in school bus related accidents totalled 8,400 in which 5,500 were students. Of the pupils killed, 35 were pedestrians either approaching or leaving a loading zone, with more than half of the pupils struck by the school bus which they were entering or leaving. These statistics are according to the National Safety Council (Accident Facts, 1985 Edition, p. 90).

Because many injuries and deaths result from poor safety habits around a school bus, and because of the emotional unpredictability of young children, an effective safety educational device is needed to instruct children regarding proper safety steps they can take when approaching or leaving the loading zone of a school bus. Films and two-dimensional posters have been created which address the issue of school bus safety. However, these films and posters often do not illustrate the various "danger zones" surrounding the school bus. More importantly, a film or two-dimensional illustration does not teach the safety rules as effectively as a three-dimensional, "hands on" educational apparatus.

The present invention addresses the above problems associated with currently available school bus educational tools.

SUMMARY OF THE INVENTION

The present invention provides a novel method and apparatus for effectively teaching basic school bus safety principles to young children. This invention utilizes a "hands on" approach of teaching which is calculated to provide the student with higher retention of the learning materials than a merely passive approach. The apparatus of the present invention is configured in a "kit" form, in a manner that provides ease of portability to a classroom or to any location where a group of students may wish to assemble for a safety meeting. The educational method utilized by this invention involves positioning and moving portions of the kit materials relative to one another so as to portray the safety principles being taught.

According to one aspect of the invention, there is provided a kit which features a surface designating a street scene with a number of areas having various degrees of safety for the pedestrian pupil. Positioned upon this surface is a three-dimensional school bus figure which is cooperatively sized and configured relative to the safety areas of the surface such that when the bus figure is placed in a certain designated area of the surface, a "most dangerous" zone on the surface surrounds the bus. The educational device also includes a three-dimensional child figure and a three-dimensional car which are respectively proportionately sized and configured relative to the school bus and to the various safety areas on the surface so as to portray actual, real-life characterizations of the figures they represent. In use, the child figure and/or the car can be moved around to various positions on the surface relative to the school bus. This positioning of the child figure by school children effectively illustrates the size of the child figure relative to the windows on the bus, the height of the windows on the school bus and car, and the height of the hood of the bus, thereby giving meaning to the various safety or danger zones designated on the surface. The present invention also effectively illustrates how difficult it is for the driver of the school bus or car to see the child when he or she is approaching or leaving the bus loading zone. By using this "hands on" approach, children learn the importance of safety rules, which means that school bus-related deaths and injuries can be alleviated.

According to one aspect of the present invention, the school bus educational apparatus comprises a surface depicting a street area and depicting zones of varying degrees of danger, a three-dimensional school bus to be placed upon the surface so that a most dangerous zone surrounds the bus, and a three-dimensional child figure which can be positioned on different areas of the surface to illustrate various degrees of danger. The invention may also include a three-dimensional car, which can be positioned on the surface to illustrate how students should conduct themselves around a school bus.

According to another aspect of the present invention, a method for demonstrating school bus safety comprises the positioning of the school bus on the surface so that the most dangerous zone completely surrounds the bus, and the positioning of the three-dimensional child figure to different areas of the surface to illustrate school bus safety principles. The method may also include positioning a three-dimensional car around the surface to further enhance the student's understanding of safety rules.

For a better understanding of the invention and the advantages obtained by its use, reference should be had to the drawings and to the accompanying descriptive matter, in which there is illustrated and described a preferred embodiment of the invention.

BRIEF DESCRIPTION OF THE DRAWINGS

In the Drawings, reference numerals and letters indicate corresponding parts throughout several views.

DETAILED DESCRIPTION OF THE PREFERRED EMBODIMENT

Figure 1:
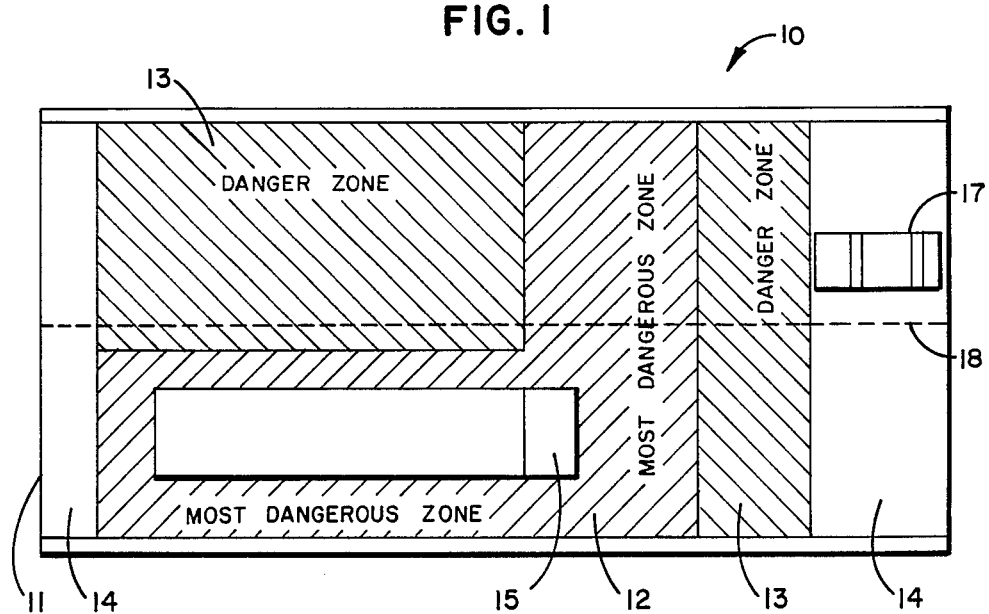
FIG. 1 is a plan view of the surface of the present invention with the school bus and car positioned thereon.

Referring to the Drawings, the school bus educational kit constructed according to a preferred embodiment of the present invention is shown generally at 10. The educational kit of the present invention includes a generally rectangular shaped surface 11. The surface 11 is preferably made of Lexan ® plastic, but a variety of materials could be used. The surface 11 could be constructed to be either substantially flexible or substantially rigid. The surface 11 has a graphic or pictorial representation on its upper surface that generally includes a center line 18 which illustrates the center line of the street. Also represented on the surface 11 are various designated zones of relative danger. There is a "most dangerous" zone 12, a "danger" zone 13, a relatively non-dangerous zone 14, and a "safe" zone 19. Preferably, the zones 12, 13, 14, 19 are illustrated in different colors or by different patterns so that their boundaries are readily apparent. The various zones depicted upon the surface 11 are sized and configured to illustrate the differing degrees of danger for a child figure 16 depending on its position, as described in more detail below.

Suitable for positioning upon the surface 11 of the educational kit 10 is a school bus 15. The school bus 15 is sized and configured to be cooperatively positioned within a certain area of the surface 11 so that it is completely surrounded by the most dangerous zone 12. In the preferred embodiment, the school bus 15 is made of foam rubber and Lexan ® plastic. The school bus incorporates lifelike school bus graphics with likenesses of children on the windows. Also included as a part of the educational kit 11 is a child figure 16. In the preferred embodiment, the child figure 16 is made of medical grade polypropelene plastic.

Figure 2:
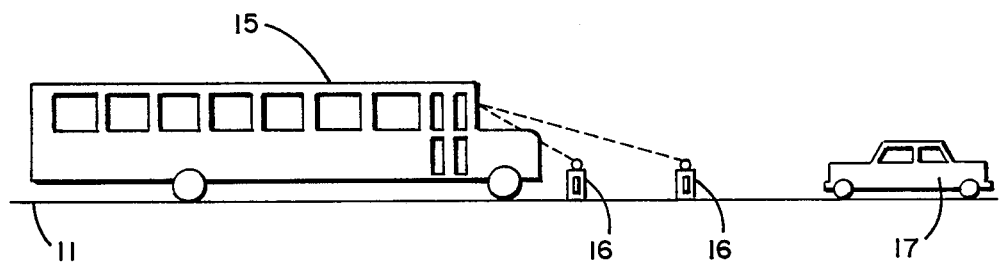
FIG. 2 is a side elevation view of the school bus, child figure, and car.

The child figure 16 is movable by the user to different areas of the surface 11. This movement allows the student to comprehend the relative size of the child figure 16 as compared to the size of the school bus, and allows the student to understand the visibility of the child figure 16 to a driver of the school bus and to a driver of another motor vehicle moving on the street area, the visibility depending upon the child figure's position. The dashed lines in FIG. 2 illustrate the bus driver's line of visibility depending upon the position of the child figure 16. For example, if the child figure 16 is too close to the hood of the bus 15, the driver is not able to see the child figure 16.

Also included in the educational kit 11 of the present invention is a car 17. The car 17 is also movable along the surface 11, so that the student can move the child figure 16 relative to both the school bus 15 and the car 17. In the preferred embodiment, the car 17 is made of foam rubber.

The various danger zones are sized and configured to reflect the differing shapes of danger for the child figure 16. The size and configuration of the various danger zones is determined according to the various school bus safety statistics, and is also based upon the ability of the school bus driver to view the child figure 16 from his position in the driver's seat.

The "most dangerous" zone is preferably scaled to extend approximately ten (10) feet in front of the school bus 15, five (5) feet on the side of the school bus nearest to the curb, three (3) feet on the opposite side of the school bus and five (5) feet from the back of the school bus. The most dangerous zone also preferably extends across the entire width of the street near the front end of the bus and then (10) feet from the front of the school bus. The "danger" zone 13A preferably extends across the centerline 18 opposite the school bus 15, with its right-hand border being approximately five (5) feet behind the front of the school bus 15, as shown in FIG. 1. The danger zone 13B also extends from ten (10) feet in front of the school to twenty (20) feet in front of the school bus, across the entire width of the street, as shown in FIG. 1. There is also a relatively non-dangerous zone 14 which extends from each longitudinal end of the surface 11 to the edge of the danger zone 13. A "safe" zone 19 extends from the curb and onto the sidewalk and is depicted as two stips along the longitudinal edges of the surface 11. The above dimensions are preferred only, and the present patent application is meant to include danger zones within acceptable ranges therefrom.

The school bus 15 is sized and configured to scale to represent an actual size of a typical schoolbus: eight (8) feet in width by thirty-seven (37) feet in length. The car 17 is sized and configured to be five and one-half (5½) feet in width by twelve (12) feet in length. The street width is scaled to be thirty-six (36) feet in width, eighteen (18) feet on each side of the center line.

As best illustrated in FIG. 2, the movable components of the kit 10 are scaled so that their relative size reflects their relative sizes in real life. Therefore, the height of the hood of the school bus 15 and the height of the bottom edge of the windows is scaled to be approximately five feet, four inches from the ground. The total height of the bus 15 is scaled to be approximately eight one-half (8½) feet from the ground. The height of the hood of the car is preferably two feet, ten inches, and the total height of the car 17 is scaled to be approximately four and one-half (4½) feet from the ground. The child figure 16 is scaled to be approximately three and one-half (3½) feet from the ground with a width of one (1) foot four (4) inches. The various components of the kit 10 are scaled to be an appropriate size so that they can be easily handled by children, and so that the kit 10 is portable and easy to store.

It is to be understood that numerous and various modifications can be readily devised in accordance with the principles of the present invention by those skilled in the art without departing from the spirit and scope of the present invention. Therefore, it is not desired to restrict the invention to the particular constructions illustrated and described, but to cover all modifications that can fall within the scope of the appended claims.

I claim:

1. School bus educational apparatus, comprising:
   (a) a surface depicting a street area with designated zones of varying degrees of danger, including a most dangerous zone;
   (b) a movable, three-dimensional school bus sized and configured to be placed upon said surface so that said most dangerous zone completely surrounds said school bus; and
   (c) a movable, three-dimensional child figure sized and configured relative to said school bus, wherein said child figure can be positioned in different areas of said surface to illustrate various degrees of danger.

2. The school bus safety educational device according to claim 1, further comprising a movable, three-dimensional car sized and configured relative to said bus and said child figure, wherein said car can be positioned in different areas of said surface to illustrate various degrees of danger.

3. The school bus safety educational device according to claim 1, wherein the height of said child figure is less than the height of a hood on said school bus.

4. The school bus safety educational device according to claim 1, wherein the height of said child figure is less than the height of the lower edge of the windows on said bus.

5. The school bus safety educational device according to claim 1, wherein said designated zones of varying degrees of danger comprise a most dangerous zone, a danger zone, a relatively non-dangerous zone, and a safe zone.

6. The school bus safety educational device according to claim 5, wherein said most dangerous zone is scaled to occupy approximately ten feet in front of said school bus across the entire width of said street area, approximately five feet on the side of said school bus nearest a curb, approximately three feet on the side of said school bus opposite said curb, and approximately five feet from the back of said school bus, whereby movement of said child figure illustrates the extent of visibility by the driver of said school bus.

7. The school bus safety educational device according to claim 5, wherein said danger zone occupies an area on the opposite side of said street area as said school bus and an area in front of said school bus adjacent said most dangerous zone.

8. The school bus safety educational device according to claim 5, wherein said relatively non-dangerous and safe zones occupy a portion of said surface not occupied by said most dangerous zone or said danger zone.

9. A method of demonstrating school bus safety upon a surface designating zones of varying degrees of danger, comprising the steps of:
  (a) positioning a three-dimensional school bus in a designated area of said surface so that a most dangerous zone completely surrounds said bus; and
  (b) moving a three-dimensional child figure around different areas of said surface relative to the position of said school bus so as to demonstrate principles of school bus safety.

10. The method of demonstrating school bus safety upon a surface designating zones of varying degrees of danger of claim 9, further comprising the step of moving a three-dimensional car around different areas of said surface relative to the position of said school bus and the position of said child figure so as to demonstrate school bus safety.

* * * * *